US008345156B2

(12) United States Patent
Yamauchi (10) Patent No.: US 8,345,156 B2
(45) Date of Patent: Jan. 1, 2013

(54) PROGRESSIVE SCANNING CONVERSION APPARATUS AND PROGRESSIVE SCANNING CONVERSION METHOD

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1493 days.

(21) Appl. No.: 11/843,842

(22) Filed: Aug. 23, 2007

(65) Prior Publication Data

US 2008/0151107 A1 Jun. 26, 2008

(30) Foreign Application Priority Data

Dec. 26, 2006 (JP) ................................ 2006-350402

(51) Int. Cl.
*H04N 7/01* (2006.01)
(52) U.S. Cl. ...................................................... 348/448
(58) Field of Classification Search .................. 348/448, 348/452, 701
See application file for complete search history.

(56) References Cited

U.S. PATENT DOCUMENTS

| 6,509,930 | B1 * | 1/2003 | Hirano et al. ................. 348/452 |
| 6,545,719 | B1 * | 4/2003 | Topper .......................... 348/448 |
| 7,050,108 | B2 * | 5/2006 | Nishibori et al. ............. 348/459 |
| 7,236,205 | B2 * | 6/2007 | Nagata .......................... 348/448 |
| 2005/0140825 | A1 * | 6/2005 | Kasahara et al. ............. 348/452 |

FOREIGN PATENT DOCUMENTS

| JP | 06-233252 | 8/1994 |
| JP | 06-292149 | 10/1994 |
| JP | 06-311485 | 11/1994 |
| JP | 06-339124 | 12/1994 |

(Continued)

OTHER PUBLICATIONS

Japanese Office Action dated Oct. 4, 2011.

*Primary Examiner* — Vivek Srivastava
*Assistant Examiner* — Aklil Tesfaye
(74) *Attorney, Agent, or Firm* — Pillsbury Winthrop Shaw Pittman, LLP (57) ABSTRACT

According to one embodiment, a progressive scanning conversion apparatus comprising: a motion detecting unit that detects a motion during one frame for each pixel and that outputs an output value between a still image determination value and a moving image determination value; a still image interpolation pixel generating unit that generates still image interpolation pixels from at least one of a preceding field signal and a following field signal; a moving image interpolation pixel generating unit that generates moving image interpolation pixels from at least one of a current field signal, the preceding field signal and the following field signal; an interpolation pixel mixing generating unit that mixes the still image interpolation pixels to the moving image interpolation pixels at an adjustable mixing ratio; an inter-field zero vector correlation detecting unit that detects correlation of corresponding small regions in a current field and a preceding field or in the current field and a following field, the corresponding small regions occupying the same area in an entire screen; and a motion detection correcting unit that corrects the output value to be closer to the moving image determination value when the correlation detected by the inter-field zero vector correlation detecting unit is lower; wherein, when the corrected output value is closer to the still image determination value, the interpolation pixel mixing generating unit increases the adjustable mixing ratio; and wherein, when the corrected output value is closer to the moving image determination value, the interpolation pixel mixing generating unit decreases the adjustable mixing ratio.

10 Claims, 11 Drawing Sheets

FOREIGN PATENT DOCUMENTS

| | | |
|---|---|---|
| JP | 08-316849 | 11/1996 |
| JP | 10108218 | 4/1998 |
| JP | 2000244877 | 9/2000 |
| JP | 2000259146 | 9/2000 |
| JP | 2001320679 | 11/2001 |
| JP | 2003-179886 | 6/2003 |
| JP | 2003339027 | 11/2003 |
| JP | 2004236353 | 8/2004 |

* cited by examiner

PROGRESSIVE SCANNING CONVERSION APPARATUS AND PROGRESSIVE SCANNING CONVERSION METHOD

CROSS-REFERENCE TO RELATED APPLICATIONS

This application is based upon and claims the benefit of priority from Japanese Patent Application No. 2006-350402, filed Dec. 26, 2006, the entire contents of which are incorporated herein by reference.

BACKGROUND

1. Field

One embodiment of the invention relates to a motion adaptation type progressive scanning conversion apparatus and a progressive scanning conversion method.

2. Description of the Related Art

There has been known a progressive scanning conversion which converts video signals in an interlaced scan mode into those in a progressive scanning mode in signal processing of video signals. In order to preserve a sense of naturalness which is a physical factor indispensable to a high-definition image in this progressive scanning conversion to reproduce a high quality image without a sense of discomfort in a still image and a moving image, for example, a technique disclosed in Japanese Patent Publication No. 3531379 has been proposed.

In the above Patent Document, the combination of motion adaptation type MA interpolation and motion compensation type MC interpolation has been proposed. More specifically, this is characterized in that the ratio of the MA interpolation result is increased when the motion compensation is impossible or motion vector components are large.

Figure 11A:
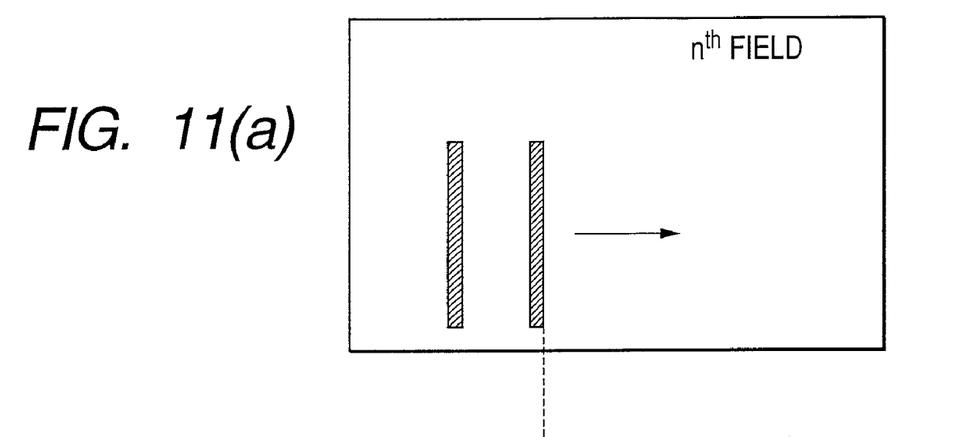
FIG. 11 illustrates an operation example of the prior art.
Figure 11B:
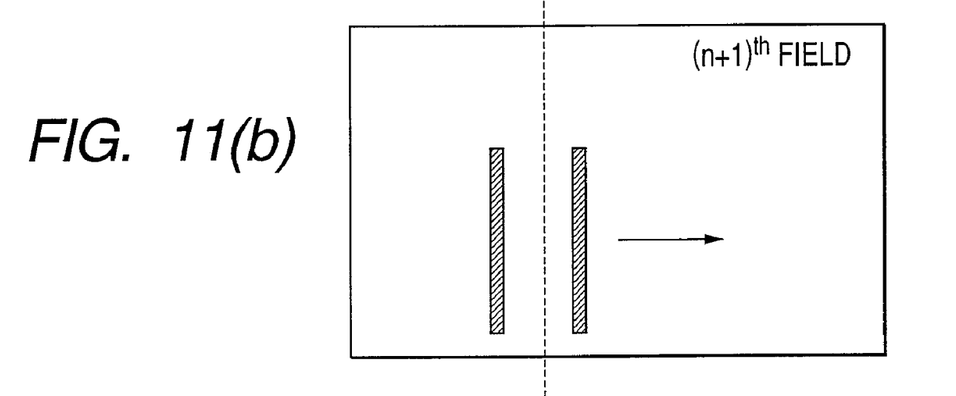
Figure 11C:
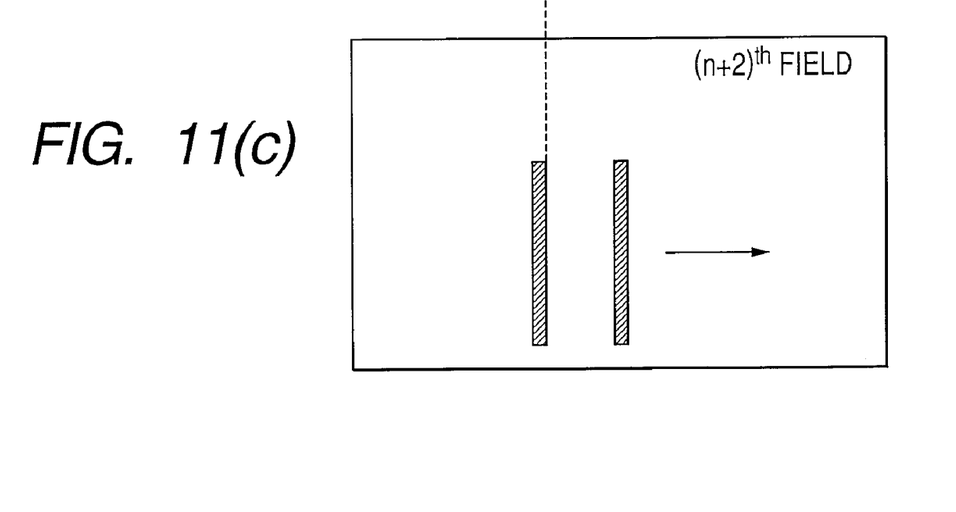

However, the technology disclosed in the above Patent Document 1 does not suppress the erroneous determination of motion detection between frames. For example, as shown in FIG. 11, two parallel vertical lines moving rightward in the $n^{th}$ field in FIG. 11(a) will be described as an example. It is assumed that in the $(n+2)^{th}$ field in FIG. 11(c), the left line of two vertical lines is at the same position as that of the right line of two vertical lines of the $n^{th}$ field in FIG. 11(a). In the prior art technology, the vertical line which is at the same position is erroneously determined to be a pattern having no motion. When progressive scanning conversion is performed to interpolate the $(n+1)^{th}$ field, the $3^{rd}$ vertical line which does not originally exist in the $(n+1)^{th}$ field in FIG. 11(b) is displayed between two vertical lines to cause image quality degradation.

Figure 12A:
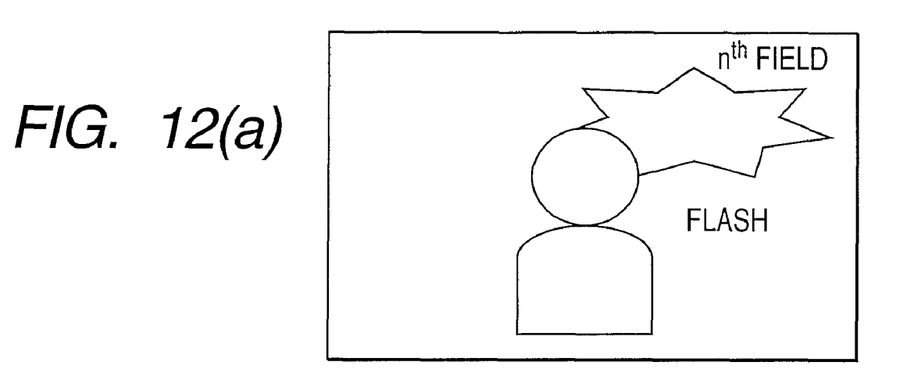
FIG. 12 illustrates an operation example of the prior art.
Figure 12B:
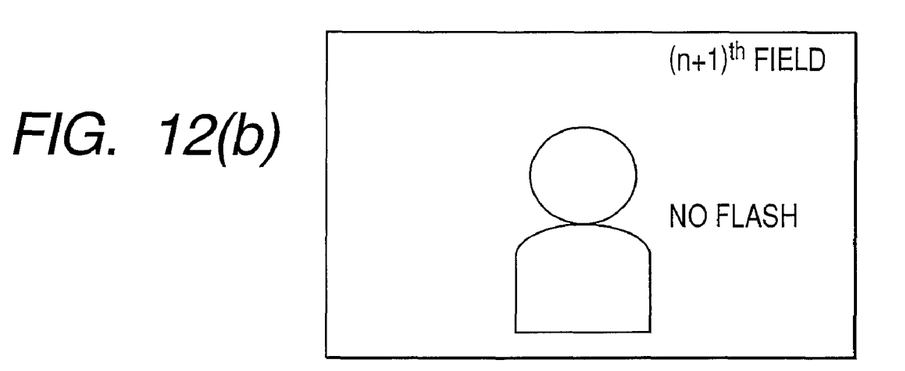
Figure 12C:
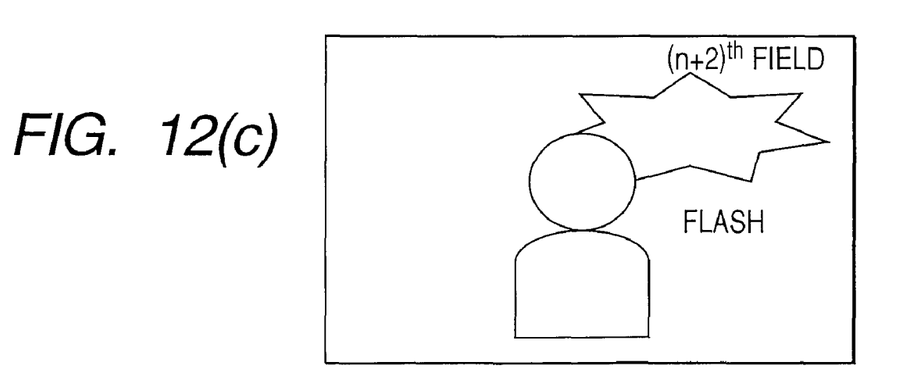

For example, as shown in FIG. 12, many flashes at a press conference or the like may cause image quality degradation. More specifically, when a flash happens to occur in the same position in the $n^{th}$ field shown in FIG. 12(a) and the $(n+2)^{th}$ field shown in FIG. 12(c), image quality may be degraded. When progressive scanning conversion is performed in this case, regardless of being a dark screen where the flash does not originally occur in the $(n+1)^{th}$ field shown in FIG. 12(b), image quality degradation occurs where a bright line and a dark line alternately enter.

SUMMARY

One of objects of the present invention is to provide a progressive scanning conversion apparatus and progressive scanning conversion method that prevent the degradation of the image quality.

According to an aspect of the present invention, there is provided a progressive scanning conversion apparatus comprises a motion detecting unit that detects a motion during one frame for each pixel and that outputs an output value between a still image determination value and a moving image determination value; a still image interpolation pixel generating unit that generates still image interpolation pixels from at least one of a preceding field signal and a following field signal; a moving image interpolation pixel generating unit that generates moving image interpolation pixels from at least one of a current field signal, the preceding field signal and the following field signal; an interpolation pixel mixing generating unit that mixes the still image interpolation pixels to the moving image interpolation pixels at an adjustable mixing ratio; an inter-field zero vector correlation detecting unit that detects correlation of corresponding small regions in a current field and a preceding field or in the current field and a following field, the corresponding small regions occupying the same area in an entire screen; and a motion detection correcting unit that corrects the output value to be closer to the moving image determination value when the correlation detected by the inter-field zero vector correlation detecting unit is lower; wherein, when the corrected output value is closer to the still image determination value, the interpolation pixel mixing generating unit increases the adjustable mixing ratio; and wherein, when the corrected output value is closer to the moving image determination value, the interpolation pixel mixing generating unit decreases the adjustable mixing ratio.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Hereinafter, preferred embodiments of the present invention will be described with reference to the accompanying drawings. In order to facilitate understanding of the description, in each of the drawings, the same reference numerals are assigned to identical components wherever possible to omit overlapping description thereof.

First Embodiment

Figure 1:
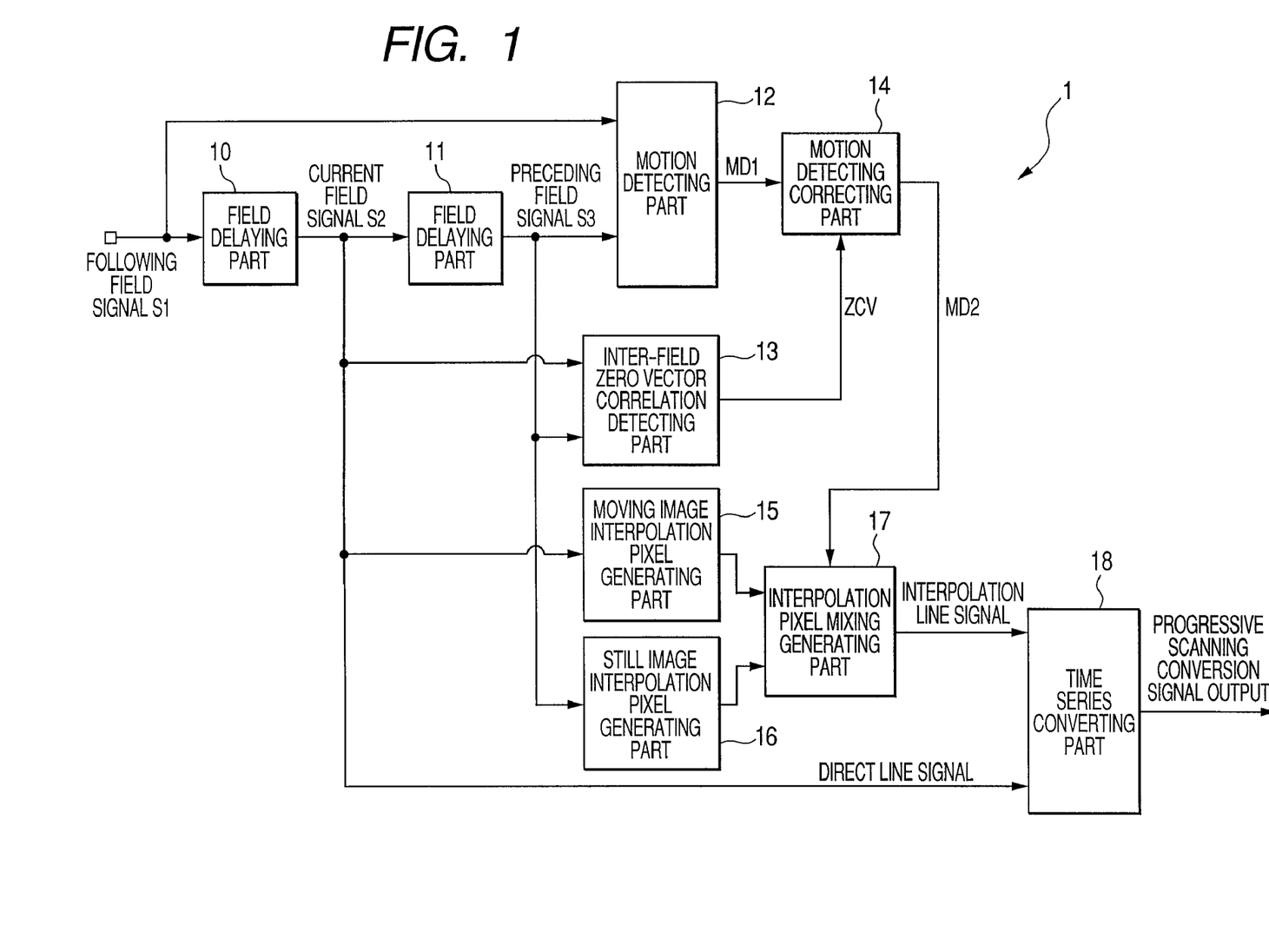
FIG. 1 shows an exemplary configuration of a progressive scanning conversion apparatus according to a first embodiment.

A progressive scanning conversion apparatus according to a first embodiment will be described with reference to FIG. 1. As shown in FIG. 1, a progressive scanning conversion apparatus 1 is provided with a field delaying part 10, a field delaying part 11, a motion detecting part 12, an inter-field zero vector correlation detecting part 13, a motion detecting correcting part 14, a moving image interpolation pixel generating part 15, a still image interpolation pixel generating part 16, an interpolation pixel mixing generating part 17, and a time series converting part 18.

The field delaying part 10 delays input field signals by one field. More specifically, the field delaying part 10 delays input following field signals S1 by one field, and outputs the delayed following field signals S1 as current field signals S2 to the field delaying part 11. The current field signals S2 are further output to the inter-field zero vector correlation detecting part 13, the moving image interpolation pixel generating part 15, and the time series converting part 18.

The field delaying part 11 delays input field signals by one field. More specifically, the field delaying part 11 delays the current field signals S2 to be output from the field delaying part 10 by one field, and outputs the delayed current field signals S2 as preceding field signals S3 to the motion detecting part 12. The preceding field signals S3 are further output to the inter-field zero vector correlation detecting part 13, and the still image interpolation pixel generating part 16.

The motion detecting part 12 detects a motion during one frame for each pixel. The motion detecting part 12 outputs signals detected based on the following field signals S1 and the preceding field signals S3 as motion detecting part output MD1 to the motion detecting correcting part 14.

The inter-field zero vector correlation detecting part 13 detects the correlation of small regions where the entire screen is divided at the same screen position in a current field and a preceding field, or the current field and a following field. Preferably, the inter-field zero vector correlation detecting part 13 detects between a field to be used for a still image interpolation pixel and the current field. In this case, the inter-field zero vector correlation detecting part 13 detects between the current field and the preceding field.

Figure 2:
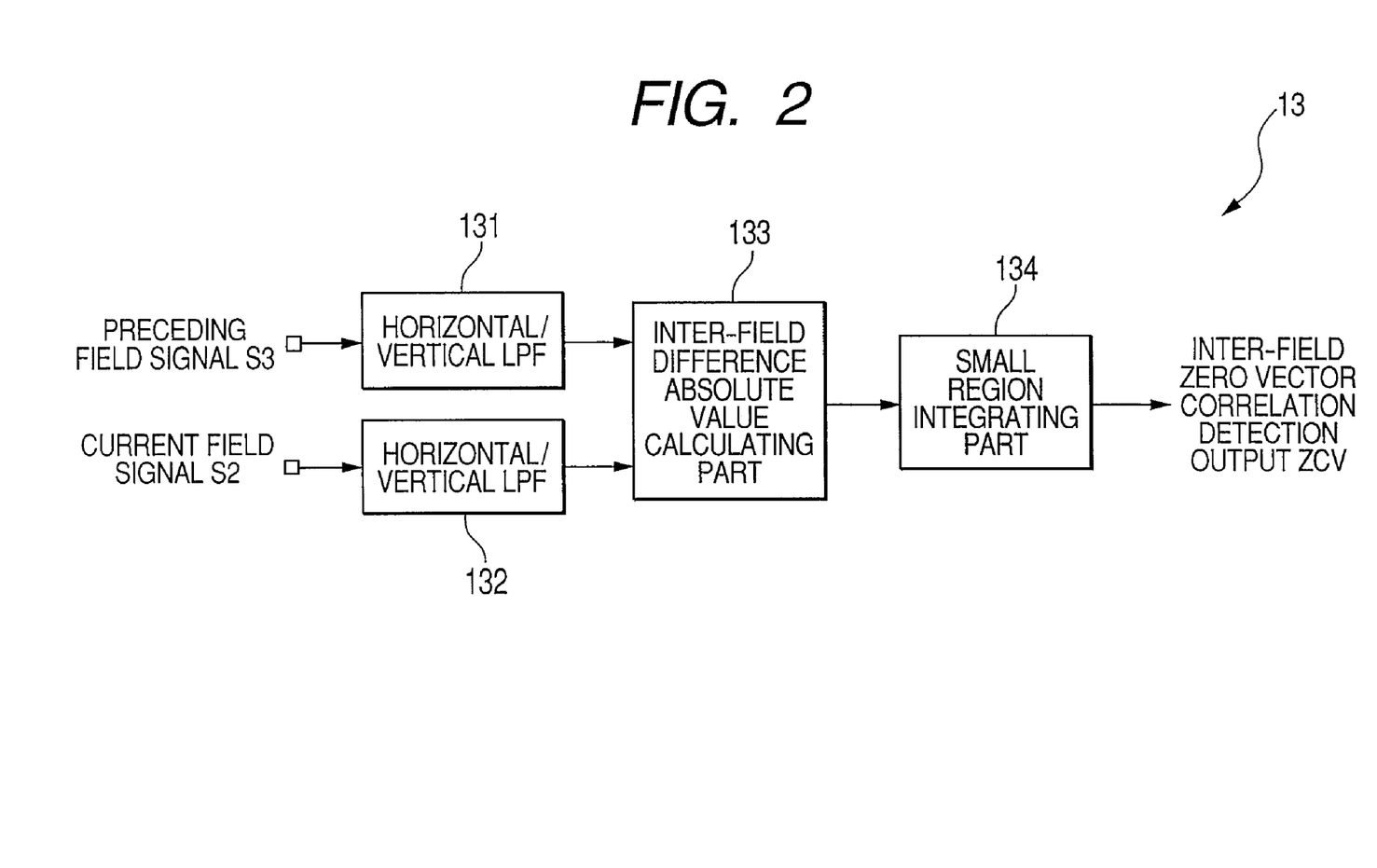
FIG. 2 illustrates an exemplary inter-field zero vector correlation detecting part shown in FIG. 1.

FIG. 2 shows the configuration of the inter-field zero vector correlation detecting part 13 more specifically. As shown in FIG. 2, the inter-field zero vector correlation detecting part 13 is provided with a horizontal/vertical low pass filter 131, a horizontal/vertical low pass filter 132, an inter-field difference absolute value calculating part 133, and a small region integrating part 134.

The preceding field signals S3 are input into the horizontal/vertical low pass filter 131. Signals output from the horizontal/vertical low pass filter 131 are output to the inter-field difference absolute value calculating part 133. The current field signals S2 are input into the horizontal/vertical low pass filter 132. Signals output from the horizontal/vertical low pass filter 132 are outputted to the inter-field difference absolute value calculating part 133.

The inter-field difference absolute value calculating part 133 calculates the absolute value of a signal difference between the fields for each pixel unit based on the signals output from the horizontal/vertical low pass filter 131 and the horizontal/vertical low pass filter 132. The inter-field difference absolute value calculating part 133 outputs the calculated inter-field difference absolute value to the small region integrating part 134.

The small region integrating part 134 integrates the inter-field difference absolute value in each of the small regions where the screen is divided based on the inter-field difference absolute value. The small region integrating part 134 outputs the integration result as inter-field zero vector correlation detection output ZCV to the motion detecting correcting part 14.

Returning to FIG. 1, the motion detecting correcting part 14 corrects the output of the motion detecting part 12 to be closer to the moving image determination when the correlation of the output ZCV of the inter-field zero vector correlation detecting part 13 is determined to be low.

Figure 3:
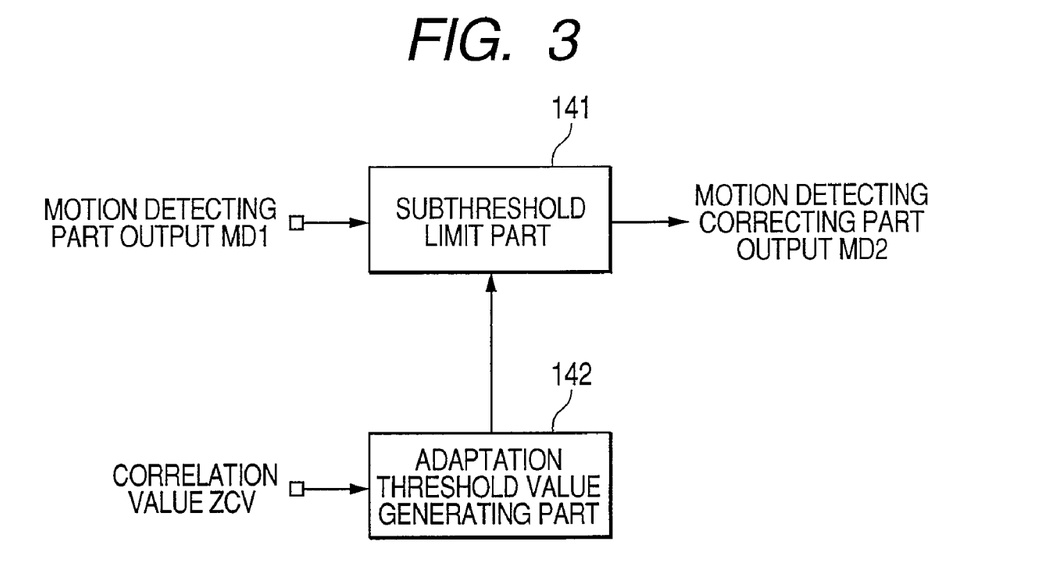
FIG. 3 illustrates an exemplary motion detecting correcting part shown in FIG. 1.

Preferably, the motion detecting correcting part 14 corrects the output of the motion detecting part 12 for being limited at a threshold value closer to the moving image determination when the correlation of the output of the inter-field zero vector correlation detecting part 13 is determined to be low. FIG. 3 shows a specific example in this case. As shown in FIG. 3, in this case, the motion detecting correcting part 14 is provided with a subthreshold limit part 141 and an adaptation threshold value generating part 142.

Into the adaptation threshold value generating part 142, the inter-field zero vector correlation detection output ZCV is input. The larger the value of this output ZCV is, the lower the correlativity is. The smaller the value is, the higher the correlativity is. When the inter-field zero vector correlation detection output ZCV is larger, the adaptation threshold value generating part 142 outputs a larger threshold value to the subthreshold limit part 141.

The motion detecting part output MD1 is input into the subthreshold limit part 141. The larger the value of this output MD1 is, the higher a moving degree (degree closer to a moving image) is, and the smaller the value is, the higher a non-moving degree (degree closer to a still image) is. The subthreshold limit part 141 corrects for limiting the motion detecting part output MD1 based on the threshold value generated by the adaptation threshold value generating part 142, and outputs the result of the correction as motion detecting correcting part output MD2 to the interpolation pixel mixing generating part 17. More specifically, when the motion detecting part output MD1 is lower than the threshold value, the MD1 is corrected to the same value as the threshold value. As a resule, the motion detecting correcting part output MD2 is limited to be closer to the moving image determination.

Figure 4:
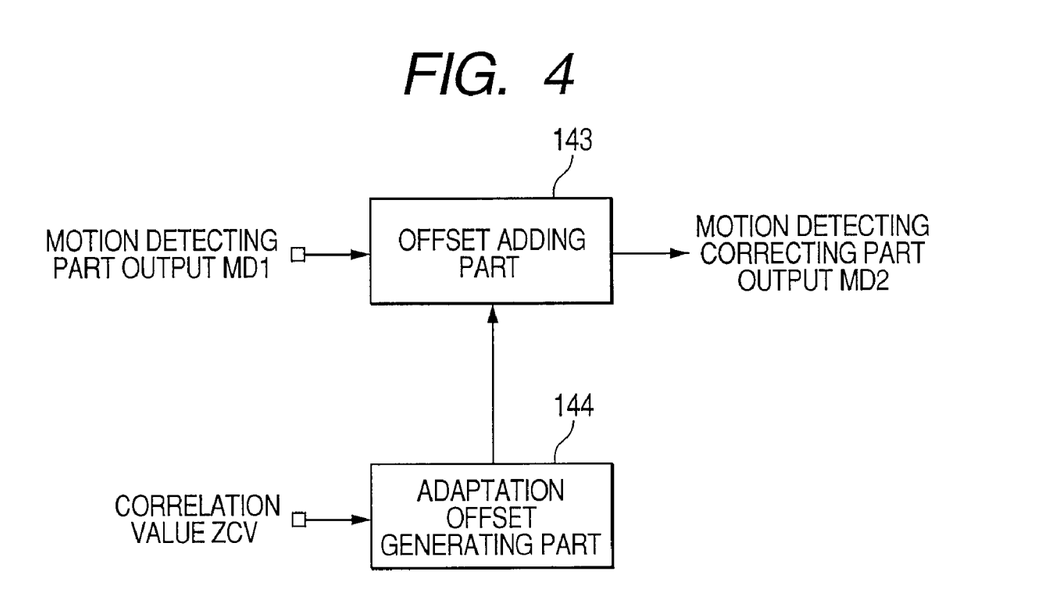
FIG. 4 illustrates the exemplary motion detecting correcting part shown in FIG. 1.

Preferably, the motion detecting correcting part 14 corrects for adding offset closer to the moving image determination to the output of the motion detecting part 12 when the correlation of the output of the inter-field zero vector correlation detecting part 13 is determined to be low. FIG. 4 shows a specific example in this case. As shown in FIG. 4, in this case, the motion detecting correcting part 14 is provided with an offset adding part 143 and an adaptation offset generating part 144.

The inter-field zero vector correlation detection output ZCV is input into the adaptation offset generating part 144. The larger the value of this output ZCV is, the lower the correlativity thereof is. The smaller the value is, the higher the correlativity thereof is. When the inter-field zero vector correlation detection output ZCV is larger, the adaptation offset generating part 144 outputs a large offset value to the offset adding part 143.

The motion detecting part output MD1 is input into the offset adding part 143. The larger the value of this output MD1 is, the higher a moving degree (degree closer to a moving image) is, and the smaller the value is, the higher a non-moving degree (degree closer to a still image) is. The offset adding part 143 corrects for adding offset to the motion detecting part output MD1 based on the offset value generated by the adaptation offset generating part 144, and outputs the result of the correction as the motion detecting correcting part output MD2 to the interpolation pixel mixing generating part 17.

Returning to FIG. 1, the moving image interpolation pixel generating part 15 generates a moving image interpolation pixel from any of the current field signal, the preceding field signal and the following field signal. In this embodiment, the moving image interpolation pixel generating part 15 generates the moving image interpolation pixel by intra-field interpolation from the current field signals S2. The moving image interpolation pixel generating part 15 outputs the generated moving image interpolation pixel to the interpolation pixel mixing generating part 17. The moving image interpolation pixel generating part 15 may generate the moving image interpolation pixel further by using the preceding and following fields by motion compensation.

The still image interpolation pixel generating part 16 generates the still image interpolation pixel from the preceding field signal or the following field signal. In this embodiment, the still image interpolation pixel generating part 16 outputs the pixel of the preceding field signals S3 located at the same spatial position as that of the interpolation pixel as the still image interpolation pixel to the interpolation pixel mixing generating part 17. The still image interpolation pixel generating part 16 may use the following field signal S1, and may use both the preceding field signals S3 and the following field signal S1.

The interpolation pixel mixing generating part 17 increases the ratio of the still image interpolation pixel according to the transition of the output of the motion detecting part 12 to a still determination side, and increases the ratio of the moving image interpolation pixel according to the transition of the output of the motion detecting part 12 to a moving image determination side to mix the still image interpolation pixel with the moving image interpolation pixel.

When the larger value of the motion detecting correcting part output MD2 is defined as the moving image determination, and the smaller value thereof is defined as the still image determination, the interpolation pixel mixing generating part 17 mixes the moving image interpolation pixel with the still image interpolation pixel according to the following formula.

Interpolation Line Signal=$MD2 \times$Moving Image Interpolation Pixel+$(1-MD2) \times$Still Image Interpolation Pixel, wherein $0 \leq MD2 \leq 1$.

The time series converting part 18 outputs progressive scanning conversion signals based on interpolation line signals output from the interpolation pixel mixing generating part 17 and direct line signals as the current field signals.

Since in this embodiment, the correlation of small regions where the entire screen is divided is detected at the same screen position in the current field and the preceding field, or the current field and the following field, and the output of the motion detecting part 12 is corrected to be closer to the moving image determination when the correlation is determined to be low, the erroneous determination of stillness due to the motion detection between the frames and the occurrence of erroneous interpolation noise in progressive scanning conversion output can be prevented. The use of the inter-field zero vector correlation detecting part 13 can suppress the increase in a circuit scale to a comparatively small scale.

Second Embodiment

Figure 5:
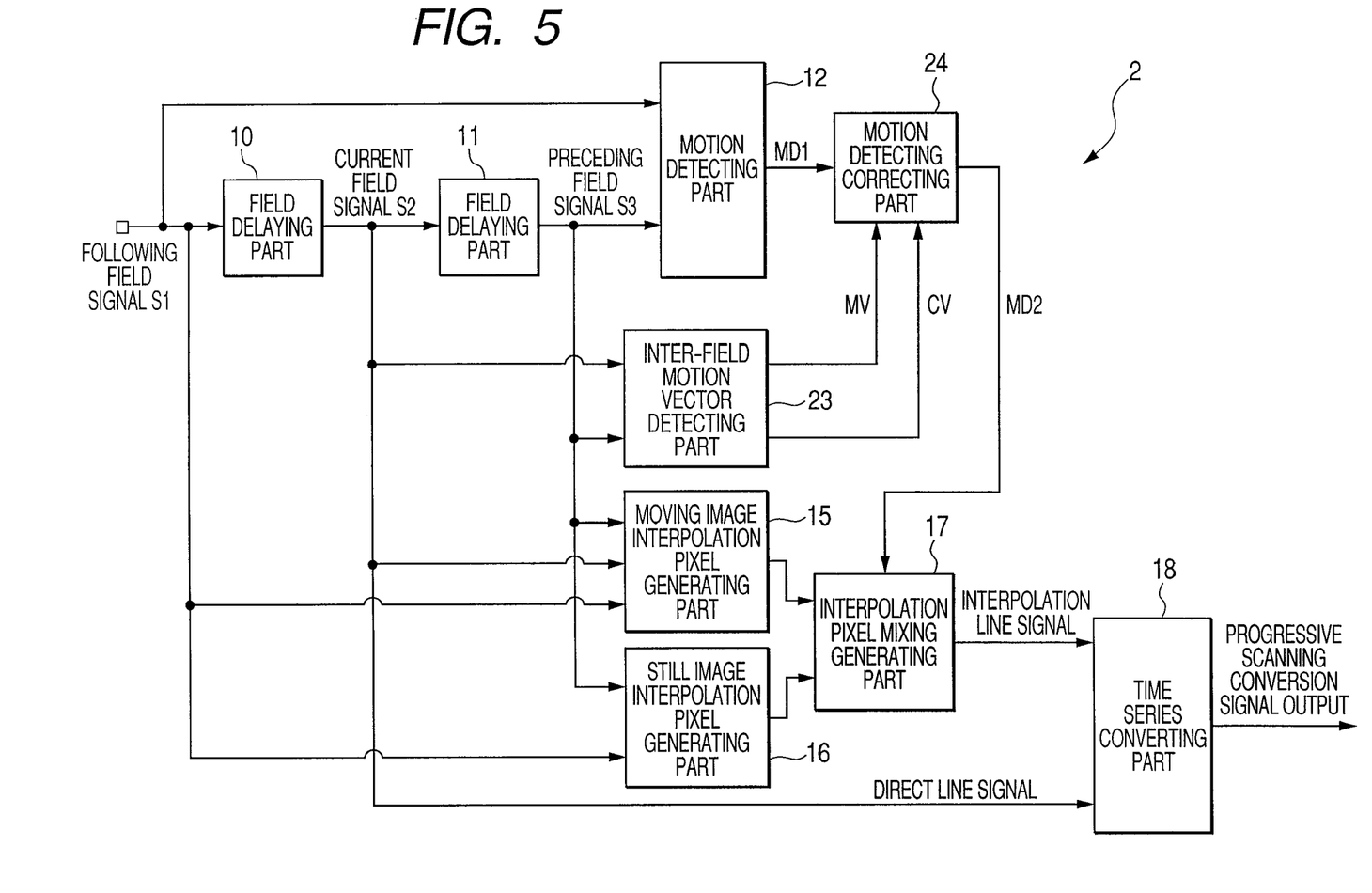
FIG. 5 shows the exemplary configuration of a progressive scanning conversion apparatus according to a second embodiment.

A progressive scanning conversion apparatus according to a second embodiment will be described with reference to FIG. 5. As shown in FIG. 5, a progressive scanning conversion apparatus 2 is provided with a field delaying part 10, a field delaying part 11, a motion detecting part 12, an inter-field motion vector detecting part 23, a motion detecting correcting part 24, a moving image interpolation pixel generating part 15, a still image interpolation pixel generating part 16, an interpolation pixel mixing generating part 17, and a time series converting part 18.

The field delaying part 10, the field delaying part 11, the motion detecting part 12, the moving image interpolation pixel generating part 15, the still image interpolation pixel generating part 16, the interpolation pixel mixing generating part 17, and the time series converting part 18 are the same as those of the first embodiment to omit description thereof.

The inter-field motion vector detecting part 23 detects the correlation of small regions where the entire screen divided is at the same screen position in a current field and a preceding field or the current field and a following field to detect a motion vector in the small region.

Figure 6:
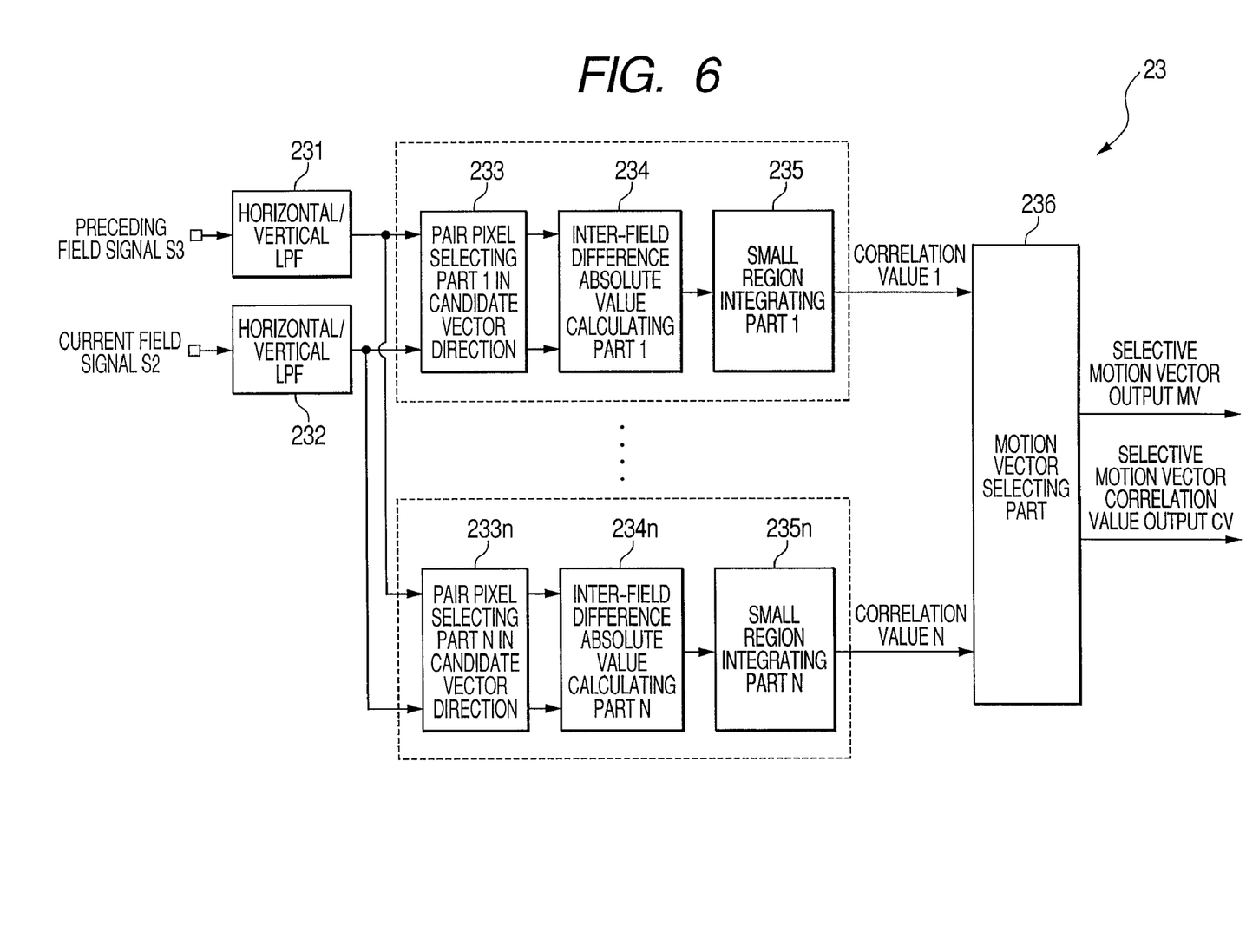
FIG. 6 illustrates an exemplary inter-field motion vector detecting part shown in FIG. 5.

FIG. 6 shows the configuration of the inter-field motion vector detecting part 23 more specifically. As shown in FIG. 6, the inter-field motion vector detecting part 23 is provided with a horizontal/vertical low pass filter 231, a horizontal/vertical low pass filter 232, a pair pixel selecting part 233 in a candidate vector direction, an inter-field difference absolute value calculating part 234, a small region integrating part 235, and a motion vector selecting part 236. The pair pixel selecting part 233 in the candidate vector direction, the inter-field difference absolute value calculating part 234, and the small region integrating part 235 are respectively provided in 1 to n.

Preceding field signals S3 are input into the horizontal/vertical low pass filter 231. Signals output from the horizontal/vertical low pass filter 231 are output to the pair pixel selecting parts 233 (1 to n) in the candidate vector directions. Current field signals S2 are input into the horizontal/vertical low pass filter 232. Signals output from the horizontal/vertical low pass filter 232 are output to the pair pixel selecting parts 233 (1 to n) in the candidate vector directions.

The pair pixel selecting parts 233 (1 to n) in the candidate vector direction are set respectively at a different direction to the candidate vector direction. The pair pixel selecting parts 233 select pixels which serve as a pair in the direction, and output to the inter-field difference absolute value calculating parts 234 (1–n) which respectively correspond.

The inter-field difference absolute value calculating parts 234 (1 to n) calculate the absolute value of signal difference between fields for each pixel unit. The inter-field difference absolute value calculating parts 234 (1 to n) output the calculated inter-field difference absolute value to the small region integrating parts 235 (1 to n) which respectively correspond.

The small region integrating parts 235 (1 to n) integrate the inter-field difference absolute value in each small region where the screen is divided based on the inter-field difference absolute value. The small region integrating parts 235 (1 to n)

output the integration result as correlation values 1 to N to the motion vector selecting part 236.

The motion vector selecting part 236 selects the optimal motion vector among the N directions based on N pieces of correlation values output from each of the small region integrating parts 235 (1 to n). The motion vector selecting part 236 outputs selective motion vector output MV and selective motion vector correlation value output CV to the motion detecting correcting part 24.

Returning to FIG. 5, the motion detecting correcting part 24 corrects the output of the motion detecting part 12 to be closer to the moving image determination when the motion vector detected by the inter-field motion vector detecting part 23 is other than a still vector and the correlation of small regions in the direction of the detected motion vector is determined to be high. The motion detecting correcting part 24 performs this correction based on the selective motion vector output MV, the selective motion vector correlation value output CV, and motion detection output MD1.

Figure 7:
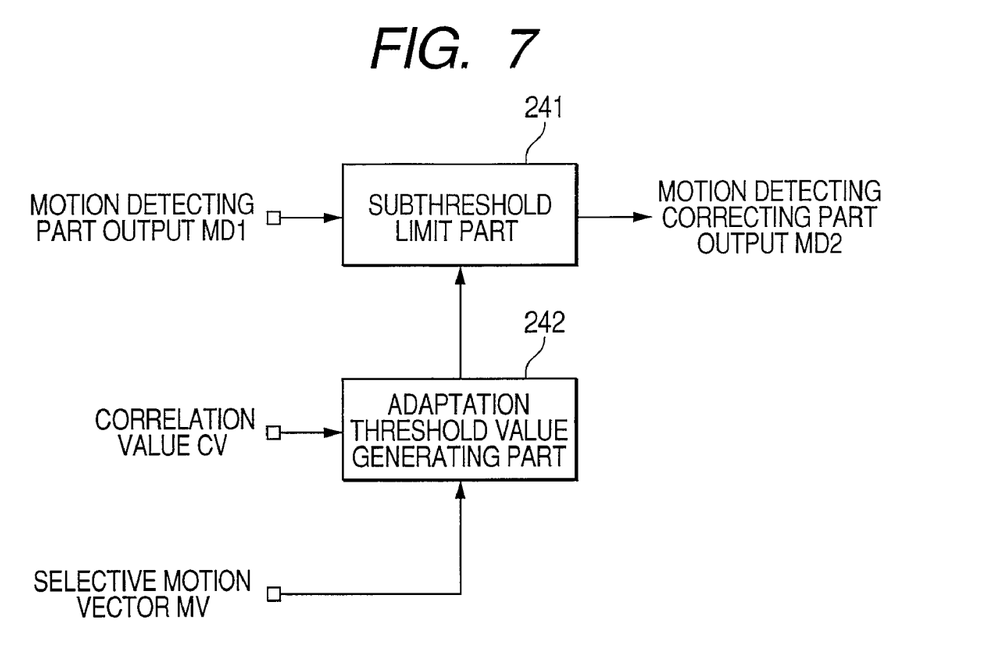
FIG. 7 illustrates an exemplary motion detecting correcting part shown in FIG. 5.

Preferably, the motion detecting correcting part 24 corrects for limiting the output of the motion detecting part 12 at a threshold value closer to the moving image determination when the motion vector selected by the inter-field motion vector detecting part 23 is other than the still vector and the correlation of small regions in the direction of the motion vector is determined to be high. FIG. 7 shows a specific example in this case. As shown in FIG. 7, the motion detecting correcting part 24 in this case is provided with a subthreshold limit part 241 and an adaptation threshold value generating part 242.

The selective motion vector correlation value output CV and the selective motion vector output MV are input into the adaptation threshold value generating part 242. The larger the value of this output CV is, the lower the correlativity is. The smaller the value is, the higher the correlativity is. When the selective motion vector output MV is other than the still vector and the selective motion vector correlation value output CV is smaller, the adaptation threshold value generating part 242 outputs a larger threshold value to the subthreshold limit part 241.

The motion detecting part output MD1 is input into the subthreshold limit part 241. The larger the value of this output MD1 is, the higher a moving degree (degree closer to a moving image) is, and the smaller the value is, the higher a non-moving degree (degree closer to a still image) is. The subthreshold limit part 241 corrects for limiting the motion detecting part output MD1 based on a threshold value generated by the adaptation threshold value generating part 242. The subthreshold limit part 241 outputs the result of the correction as motion detecting correcting part output MD2 to the interpolation pixel mixing generating part 17.

Figure 8:
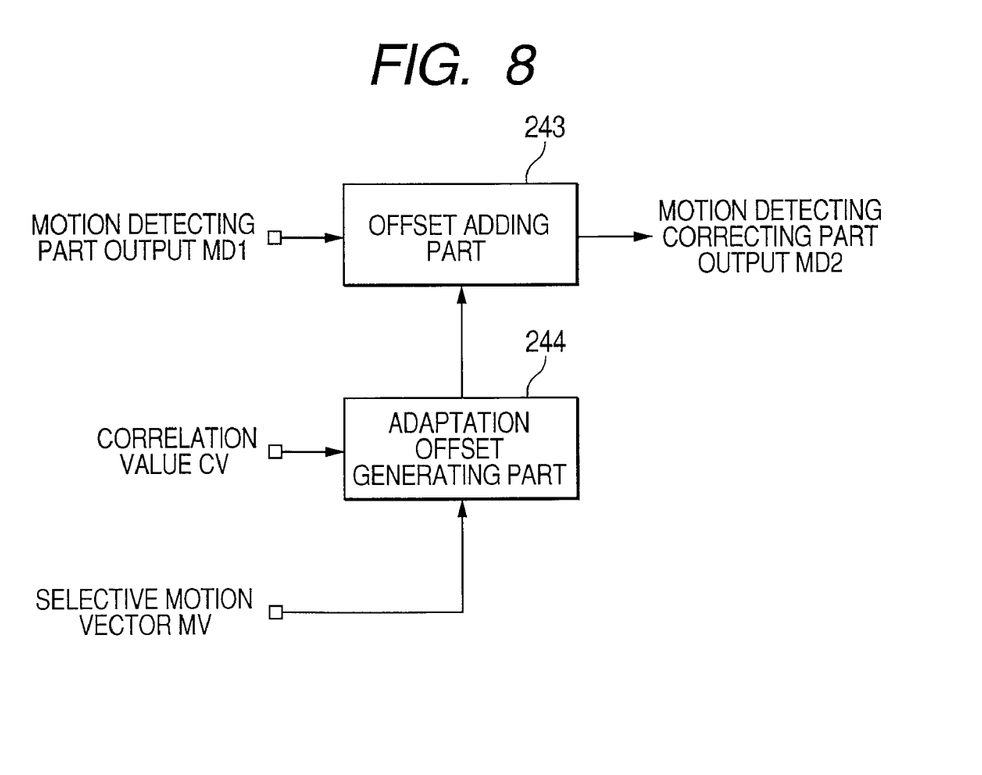
FIG. 8 illustrates the exemplary motion detecting correcting part shown in FIG. 5.

Preferably, the motion detecting correcting part 24 corrects for adding offset closer to the moving image determination to the output of the motion detecting part 12 when the motion vector detected by the inter-field motion vector detecting part 23 is other than the still vector and the correlation of small regions in the direction of the motion vector is determined to be high. FIG. 8 shows a specific example in this case. As shown in FIG. 8, in this case, the motion detecting correcting part 24 is provided with an offset adding part 243 and an adaptation offset generating part 244.

The selective motion vector correlation value output CV and the selective motion vector output MV are input into the adaptation offset generating part 244. The larger the value of this output CV is, the lower the correlativity is. The smaller the value is, the higher the correlativity is. When the selective motion vector output MV is other than the still vector and the selective motion vector correlation value output CV is smaller, the adaptation offset generating part 244 outputs a larger offset value to the offset adding part 243.

The motion detecting part output MD1 is input into the offset adding part 243. The larger the value of this output MD1 is, the higher a moving degree (degree closer to a moving image) is, and the smaller the value is, the higher a non-moving degree (degree closer to a still image) is. The offset adding part 243 corrects for adding offset to the motion detecting part output MD1 based on an offset value generated by the adaptation offset generating part 244. The offset adding part 243 outputs the result of the correction as the motion detecting correcting part output MD2 to the interpolation pixel mixing generating part 17.

In this embodiment, the correlation of small regions where the entire screen is divided is detected at the same screen position in the current field and the preceding field, or the current field and the following field to detect the motion vector of the small region. When the detected motion vector is other than the still vector and the correlation of small regions in the direction of the detected motion vector is determined to be high, the output of the motion detecting part 12 is corrected to be closer to the moving image determination. Thereby, the erroneous determination of stillness due to the motion detection between frames and the occurrence of erroneous interpolation noise in progressive scanning conversion output can be prevented. Also, the motion detection result is corrected only when the motion vector having high reliability other than the still vector is detected by the inter-field motion vector detecting part 23. Thereby, there is little influence even in the case of the still image having very high spatial frequency components in the vertical direction, and the correction of the motion detection result closer to the moving image determination can be suppressed in the unnecessary case.

Third Embodiment

Figure 9:
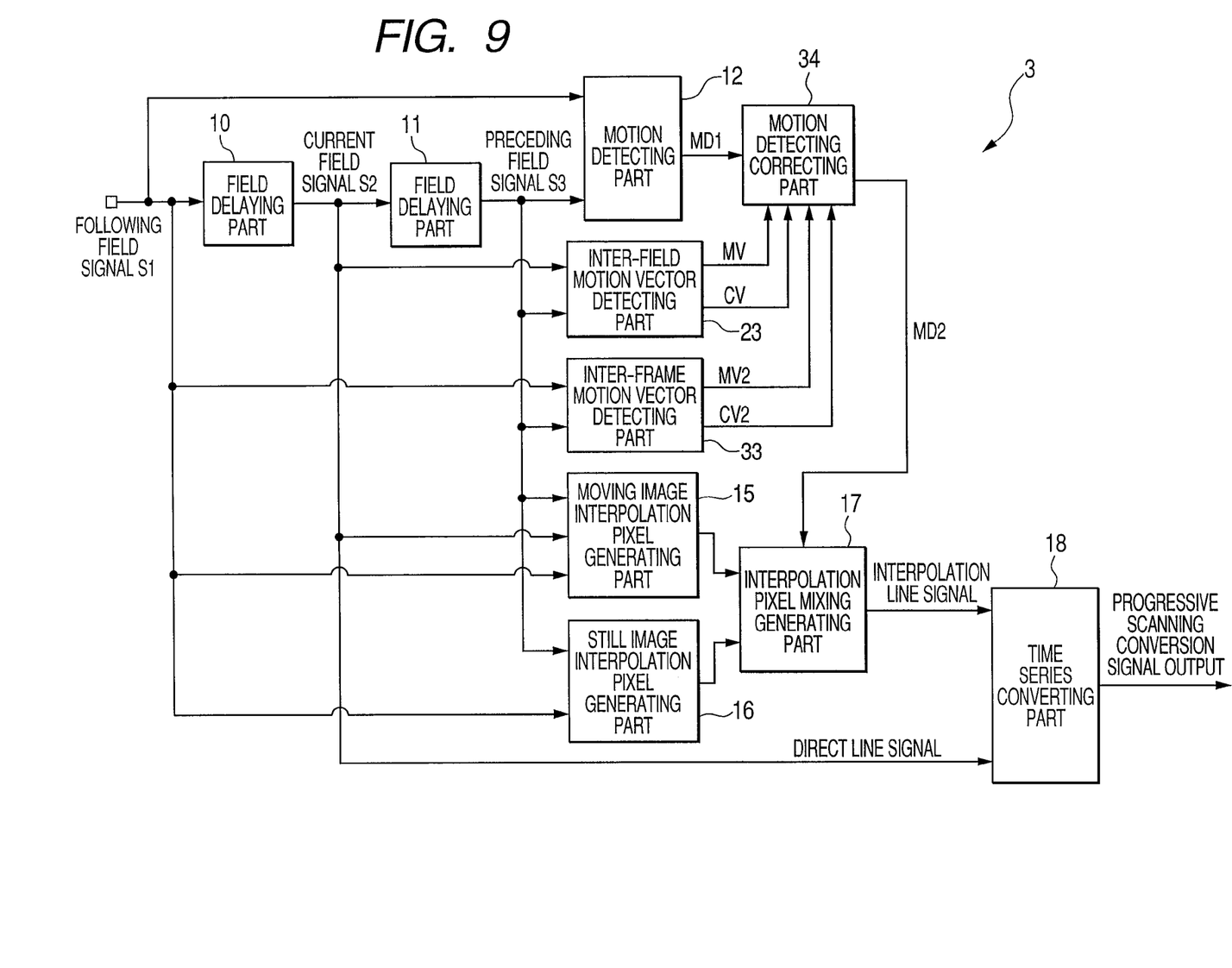
FIG. 9 shows the exemplary configuration of a progressive scanning conversion apparatus according to a third embodiment.

A progressive scanning conversion apparatus according to a third embodiment will be described with reference to FIG. 9. As shown in FIG. 9, a progressive scanning conversion apparatus 3 is provided with a field delaying part 10, a field delaying part 11, a motion detecting part 12, an inter-field motion vector detecting part 23, an inter-frame motion vector detecting part 33, a motion detecting correcting part 34, a moving image interpolation pixel generating part 15, a still image interpolation pixel generating part 16, an interpolation pixel mixing generating part 17, and a time series converting part 18.

The field delaying part 10, the field delaying part 11, the motion detecting part 12, the moving image interpolation pixel generating part 15, the still image interpolation pixel generating part 16, the interpolation pixel mixing generating part 17, and the time series converting part 18 are the same as those of the first embodiment, and the inter-field motion vector detecting part 23 is the same as those of the second embodiment to omit description thereof.

The inter-frame motion vector detecting part 33 detects the correlation of the small regions between the preceding field and the following field to detect the motion vector in the small region. The inter-frame motion vector detecting part 33 outputs the selective motion vector output MV2 and the selective motion vector correlation value output CV2 to the motion detecting correcting part 34.

The motion detecting correcting part 34 corrects the output of the motion detecting part 12 to be closer to the moving image determination even when the motion vector selected by the inter-frame motion vector detecting part 33 is other than the still vector and the correlation of the small regions in the direction of the motion vector is determined to be high.

Since the motion vector having high reliability other than the still vector can be detected by the inter-frame motion vector detecting part 33, and the motion detection result is corrected to be closer to the moving image determination in this embodiment, the erroneous interpolation noise can be prevented.

Figure 13A:
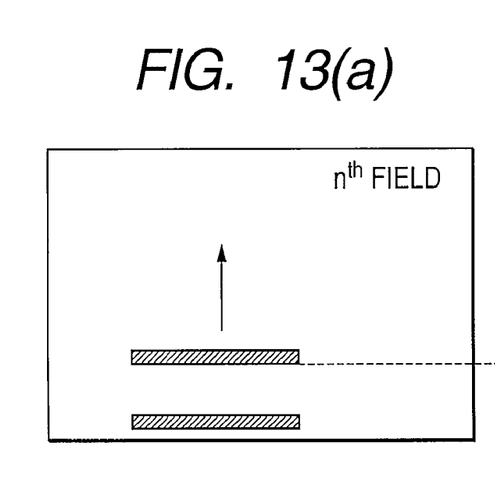
FIG. 13 illustrates an exemplary effect of the third embodiment.
Figure 13B:
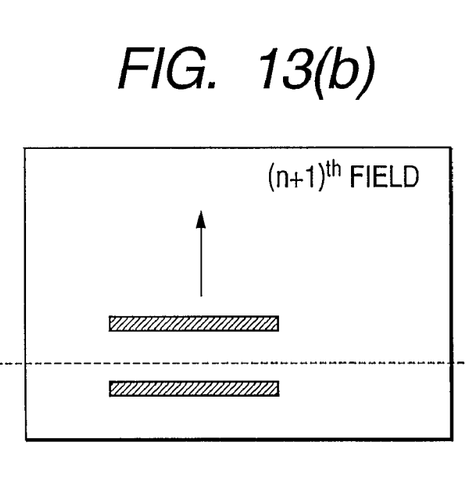
Figure 13C:
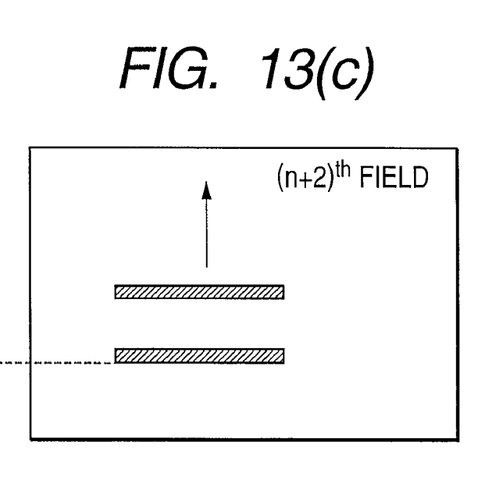

The effects of this embodiment will be more specifically described with reference to images illustrated in FIG. 13. Two horizontal lines are moving upward in the moving image illustrated in FIGS. 13(a), 13(b), 13(c). Since the lower horizontal line of the $(n+2)^{th}$ field (FIG. 13(c)) bottom is moving at a speed so that the lower horizontal line is located at the position of the upper horizontal line of the $n^{th}$ field (FIG. 13(a)), the inter-frame motion detection result for progressive scanning conversion of the $(n+1)^{th}$ field (FIG. 13(b)) is the still determination. Herein, if these two horizontal lines have extremely high spatial frequency components in the vertical direction, the motion vector having high reliability is hardly detected only by the inter-field motion vector detecting part 23.

Then, since the inter-field motion vector detecting part 23 as well as the inter-frame motion vector detecting part 33 are provided in this embodiment, the motion vector having high reliability can be detected even in the moving image illustrated in FIG. 13.

Figure 10:
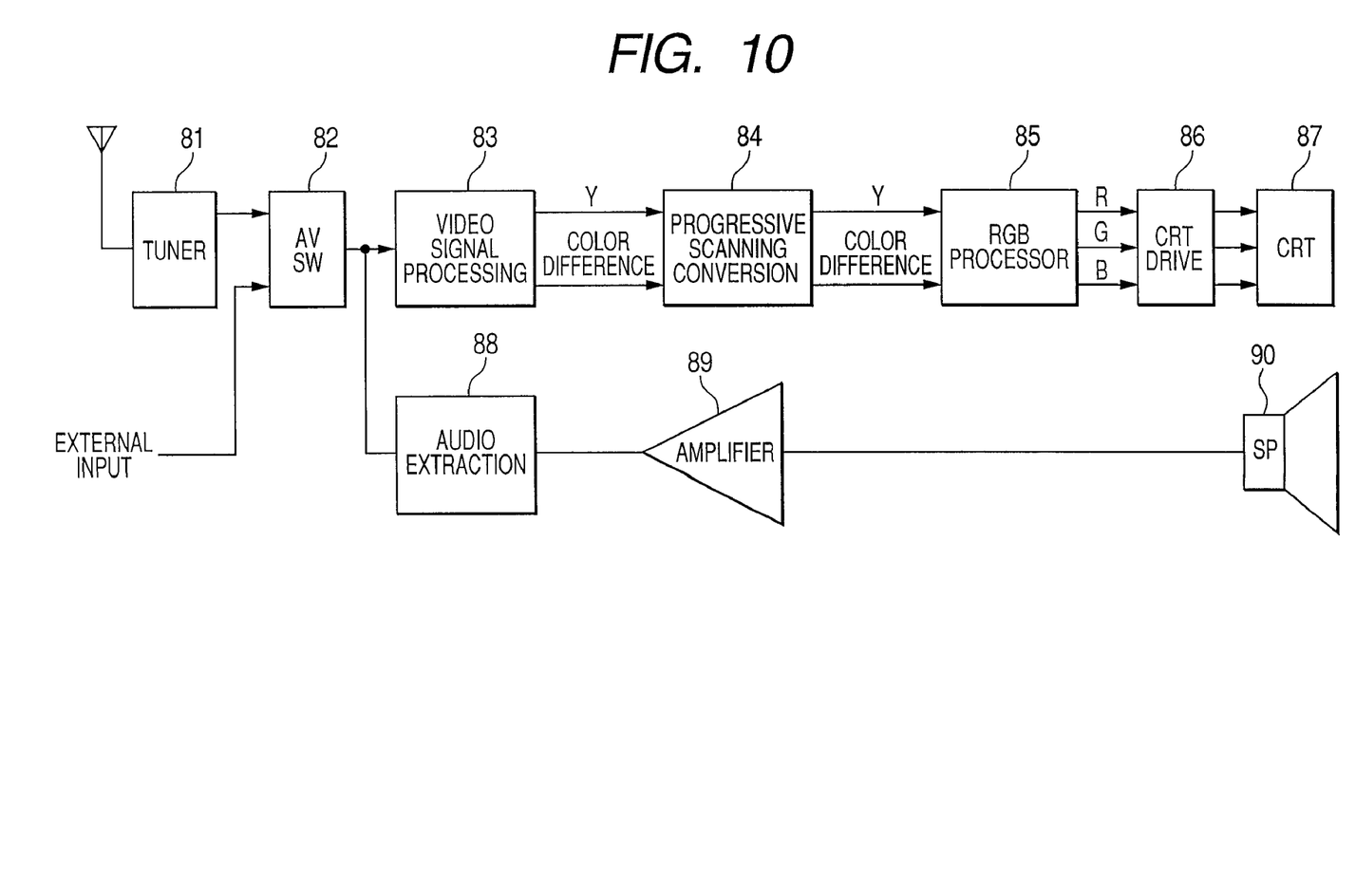
FIG. 10 shows the exemplary configuration of an image display apparatus using the progressive scanning conversion apparatus according to the third embodiment.

FIG. 10 is a block diagram showing an example of a television apparatus (image display apparatus) using the progressive scanning conversion apparatus according to this embodiment. In FIG. 10, the television apparatus has a tuner 81, an AV switch circuit 82 and a video signal processing part 83. The tuner 81 demodulates broadcast signals supplied from an antenna element, and outputs video audio signals. To the AV switch circuit 82, the video audio signals are supplied, and the AV switch circuit 82 performs switching with an external input. The video signal processing part 83 performs predetermined video signal processing when the video signals are supplied to convert and output Y signals and color difference signals. Furthermore, the television apparatus has an audio extracting part 88 which separates the audio signals from the video audio signals, and an amplifier part 89 which amplifies the audio signals from the audio extracting part 88 suitably and supplies the amplified audio signals to a speaker 90.

Herein, a progressive scanning conversion processing part 84 to which the video signals are supplied from the video signal processing part 83 can apply the above progressive scanning conversion apparatus 1 to 3. The non-interlaced video signals are separated into RGB signals by an RGB processor 85. The RGB signals are suitably power-amplified by a CRT drive 86, and power-amplified RGB signals are displayed as the image by a CRT 87.

As described with reference to the embodiment, there is provided a progressive scanning conversion apparatus and progressive scanning conversion method that prevent the degradation of the image quality.

While certain embodiments of the inventions have been described, these embodiments have been presented by way of example only, and are not intended to limit the scope of the inventions. Indeed, the novel systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A progressive scanning conversion apparatus, which converts an input video signal comprising a plurality of alternately-arranged two types of fields into an output video signal comprising a plurality of frames, the apparatus comprising:
   a motion detecting unit that detects a motion in the input video signal by comparing each pixel between the same types of fields and that outputs an output value, the output value indicating a likelihood of a still image and a likelihood of a moving image;
   a still image interpolation pixel generating unit that generates still image interpolation pixels from at least one of a preceding field and a following field;
   a moving image interpolation pixel generating unit that generates moving image interpolation pixels from at least one of a current field, the preceding field, and the following field;
   an inter-field zero vector correlation detecting unit that detects correlation of corresponding regions between the current field and the preceding field or between the current field and the following field, the corresponding regions occupying the same area in an entire screen; and
   a motion detection correcting unit that outputs a modified output value by adjusting the likelihood of the moving image and the likelihood of the still image in the output value based on the detected correlation; and
   an interpolation pixel mixing generating unit that mixes the still image interpolation pixels to the moving image interpolation pixels at an adjustable mixing ratio, the adjustable mixing ratio being determined based on the modified output value.

2. A progressive scanning conversion apparatus, which converts an input video signal comprising a plurality of alternately-arranged two types of fields into an output video signal comprising a plurality of frames, the apparatus comprising:
   a motion detecting unit that detects a motion in the input video signal by comparing each pixel between the same types of fields and that outputs an output value, the output value indicating a likelihood of a still image and a likelihood of a moving image;
   a still image interpolation pixel generating unit that generates still image interpolation pixels from at least one of a preceding field and a following field;
   a moving image interpolation pixel generating unit that generates moving image interpolation pixels from at least one of a current field, the preceding field, and the following field;
   an inter-field motion vector detecting unit that detects correlation of corresponding regions between the current field and the preceding field or between the current field and the following field to detect a motion vector with respect to each of the corresponding regions, the corresponding regions occupying the same area in an entire screen;
   a motion detection correcting unit that outputs a modified output value by adjusting the likelihood of the moving image and the likelihood of the still image in the output value based on the detected correlation; and
   an interpolation pixel mixing generating unit that mixes the still image interpolation pixels to the moving image interpolation pixels at an adjustable mixing ratio, the adjustable mixing ratio being determined based on the modified output value.

3. The progressive scanning conversion apparatus according to claim 1, wherein the motion detection correcting unit sets an output range of the output value between a threshold value and the moving image determination value, the threshold value being set closer to the moving image determination value as the correlation detected by the inter-field zero vector correlation detecting unit gets lower.

4. The progressive scanning conversion apparatus according to claim 1, wherein the motion detection correcting unit adds an offset to the output value so that the output value become closer to the moving image determination value as the correlation detected by the inter-field zero vector correlation detecting unit gets lower.

5. The progressive scanning conversion apparatus according to claim 2, wherein, when the motion vector is other than the still vector, the motion detection correcting unit sets a output range of the output value between a threshold value and the moving image determination value, the threshold value being set closer to the moving image determination value as the correlation of the regions in the direction of the motion vector gets higher.

6. The progressive scanning conversion apparatus according to claim 2, wherein, when the motion vector is other than the still vector, the motion detection correcting unit adds an offset to the output value so that the output value become closer to the moving image determination as the correlation of the regions in the direction of the motion vector gets higher.

7. The progressive scanning conversion apparatus according to claim 2, further comprising:
an inter-frame motion vector detecting unit that detects the correlation of the corresponding regions between the preceding field and the following field to detect the motion vector of each of the corresponding regions,
wherein the motion detection correcting unit corrects the output value to be closer to the moving image determination value when the inter-frame motion vector is other than the still vector and the correlation of the regions in the direction of the motion vector is higher.

8. The progressive scanning conversion apparatus according to claim 1, further comprising a displaying unit that displays an image based on a signal mixed by the interpolation pixel mixing generating unit.

9. The progressive scanning conversion apparatus according to claim 2, further comprising a displaying unit that displays an image based on a signal mixed by the interpolation pixel mixing generating unit.

10. A method of progressive scanning conversion that converts an input video signal comprising a plurality of alternately-arranged two types of fields into an output video signal comprising a plurality of frames, the method comprising:
detecting a motion in the input video signal by comparing each pixel between the same types of fields;
generating an output value that indicates a likelihood of a still image and a likelihood of a moving image based on the motion detecting step;
generating still image interpolation pixels from at least one of a preceding field and a following field;
generating moving image interpolation pixels from at least one of a current field, the preceding field, and the following field;
calculating correlation of corresponding regions between the current field and a preceding field, or between the current field and the following field, the corresponding regions occupying the same area in an entire screen;
outputting a modified output value by adjusting the likelihood of the moving image and the likelihood of the still image in the output value based on the detected correlation; and
mixing the still image interpolation pixels to the moving image interpolation pixels at an adjustable mixing ratio, the adjustable mixing ratio being determined based on the modified output value.

* * * * *